United States Patent
Iazikov et al.

(10) Patent No.: US 7,190,856 B1
(45) Date of Patent: Mar. 13, 2007

(54) RECONFIGURABLE OPTICAL ADD-DROP MULTIPLEXER INCORPORATING SETS OF DIFFRACTIVE ELEMENTS

(75) Inventors: Dmitri Iazikov, Springfield, OR (US); Christoph M. Greiner, Eugene, OR (US); Thomas W. Mossberg, Eugene, OR (US)

(73) Assignee: LightSmyth Technologies Inc, Eugene, OR (US)

( * ) Notice: Subject to any disclaimer, the term of this patent is extended or adjusted under 35 U.S.C. 154(b) by 0 days.

(21) Appl. No.: 11/277,491

(22) Filed: Mar. 25, 2006

Related U.S. Application Data

(60) Provisional application No. 60/666,042, filed on Mar. 28, 2005.

(51) Int. Cl.
*G02B 6/34* (2006.01)

(52) U.S. Cl. .............. 385/24; 385/18; 385/37; 385/132; 398/84; 398/87

(58) Field of Classification Search .......... 385/14, 385/18, 24, 37, 50, 129, 132; 398/79, 82–88; 359/566–572
See application file for complete search history.

(56) References Cited

U.S. PATENT DOCUMENTS

| | | |
|---|---|---|
| 3,995,937 A | 12/1976 | Baues et al. |
| 4,006,967 A | 2/1977 | Kenan et al. |
| 4,140,362 A | 2/1979 | Tien |
| 4,387,955 A | 6/1983 | Ludman et al. |
| 4,440,468 A | 4/1984 | Auracher et al. |
| 4,660,934 A | 4/1987 | Akiba et al. |
| 4,740,951 A | 4/1988 | Lizet et al. |
| 4,743,083 A | 5/1988 | Schimpe |
| 4,746,186 A | 5/1988 | Nicia |
| 4,773,063 A | 9/1988 | Hunsperger et al. |
| 4,786,133 A | 11/1988 | Gidon et al. |
| 4,803,696 A | 2/1989 | Pepper et al. |
| 4,824,193 A | 4/1989 | Maeda et al. |
| 4,834,474 A | 5/1989 | George et al. |
| 4,846,552 A | 7/1989 | Veldkamp et al. |
| 4,852,960 A | 8/1989 | Alferness et al. |

(Continued)

FOREIGN PATENT DOCUMENTS

EP  0 310 438 A1  4/1989

(Continued)

OTHER PUBLICATIONS

Capron et al, J. Lightwave Tech., vol. 11 No. 12 pp. 2009-2014 (Dec. 1993).

(Continued)

*Primary Examiner*—Hemang Sanghavi
(74) *Attorney, Agent, or Firm*—David S. Alavi

(57) ABSTRACT

A reconfigurable add-drop multiplexer (R-OADM) comprises an array of channel waveguides coupling two groups of diffractive element sets on a slab waveguide. The channel waveguides include switchable reflectors or are coupled to other channel waveguides by optical switches. Switching a reflector to reflect or setting a switch to couple two waveguides results in a corresponding wavelength channel being added or dropped. Switching the reflector to transmit or setting the switch to uncouple the two waveguides allows the corresponding wavelength channel to pass through the R-OADM without being added or dropped.

36 Claims, 3 Drawing Sheets

U.S. PATENT DOCUMENTS

| | | | |
|---|---|---|---|
| 4,923,271 | A | 5/1990 | Henry et al. |
| 4,938,553 | A | 7/1990 | Maerz et al. |
| 5,040,864 | A | 8/1991 | Hong |
| 5,107,359 | A | 4/1992 | Ohuchida |
| 5,165,104 | A | 11/1992 | Weverka |
| 5,195,161 | A | 3/1993 | Adar et al. |
| 5,357,591 | A | 10/1994 | Jiang et al. |
| 5,450,511 | A | 9/1995 | Dragone |
| 5,768,450 | A | 6/1998 | Bhagavatula |
| 5,812,318 | A | 9/1998 | Babbitt et al. |
| 5,830,622 | A | 11/1998 | Canning et al. |
| 6,011,884 | A | 1/2000 | Dueck et al. |
| 6,011,885 | A | 1/2000 | Dempewolf et al. |
| 6,137,933 | A | 10/2000 | Hunter et al. |
| 6,141,152 | A * | 10/2000 | Trouchet .................... 359/634 |
| 6,144,480 | A | 11/2000 | Li et al. |
| 6,169,613 | B1 | 1/2001 | Amitai et al. |
| 6,169,614 | B1 | 1/2001 | Whitcomb et al. |
| 6,285,813 | B1 | 9/2001 | Schultz et al. |
| 6,323,970 | B1 | 11/2001 | Popovich |
| 6,473,232 | B2 | 10/2002 | Ogawa |
| 6,553,162 | B1 | 4/2003 | Okayama |
| 6,678,429 | B2 | 1/2004 | Mossberg et al. |
| 6,702,897 | B2 | 3/2004 | Cullen et al. |
| 6,768,834 | B1 | 7/2004 | Gruhlke |
| 6,823,115 | B2 | 11/2004 | Greiner et al. |
| 6,829,417 | B2 | 12/2004 | Greiner et al. |
| 6,859,318 | B1 | 2/2005 | Mossberg |
| 6,879,441 | B1 | 4/2005 | Mossberg |
| 6,961,491 | B2 | 11/2005 | Greiner et al. |
| 6,965,464 | B2 | 11/2005 | Mossberg |
| 6,965,716 | B2 | 11/2005 | Greiner et al. |
| 6,985,656 | B2 | 1/2006 | Iazikov et al. |
| 6,987,911 | B2 | 1/2006 | Mossberg et al. |
| 6,990,276 | B2 | 1/2006 | Brice et al. |
| 6,993,223 | B2 | 1/2006 | Greiner et al. |
| 7,009,743 | B2 | 3/2006 | Mossberg |
| 7,016,569 | B2 | 3/2006 | Mule et al. |
| 7,054,517 | B2 * | 5/2006 | Mossberg et al. ............. 385/14 |
| 7,062,128 | B2 | 6/2006 | Mossberg |
| 2003/0011833 | A1 | 1/2003 | Yankov et al. |
| 2003/0039444 | A1 | 2/2003 | Mossberg et al. |
| 2003/0117677 | A1 | 6/2003 | Mossberg |
| 2004/0076374 | A1 | 4/2004 | Greiner et al. |
| 2004/0131360 | A1 | 7/2004 | Iazikov et al. |
| 2004/0170356 | A1 | 9/2004 | Iazikov et al. |
| 2004/0179779 | A1 | 9/2004 | Greiner et al. |
| 2004/0208466 | A1 | 10/2004 | Mossberg et al. |
| 2004/0258356 | A1 | 12/2004 | Brice et al. |
| 2005/0018951 | A1 | 1/2005 | Mossberg et al. |
| 2005/0078912 | A1 | 4/2005 | Iazikov et al. |
| 2005/0135744 | A1 | 6/2005 | Greiner et al. |
| 2005/0135745 | A1 | 6/2005 | Greiner et al. |
| 2005/0135747 | A1 | 6/2005 | Greiner et al. |
| 2005/0152011 | A1 | 7/2005 | Mossberg |
| 2005/0163425 | A1 | 7/2005 | Greiner et al. |
| 2006/0023280 | A1 | 2/2006 | Mossberg |
| 2006/0139712 | A1 | 6/2006 | Mossberg |

FOREIGN PATENT DOCUMENTS

| | | |
|---|---|---|
| GB | 2 168 215 A | 6/1986 |
| WO | WO-99/35523 A1 | 7/1999 |
| WO | WO-99/56159 A1 | 11/1999 |
| WO | WO 02-075411 | 9/2002 |

OTHER PUBLICATIONS

Deri et al, IEEE Photonics Tech. Lett., vol. 6 No. 2 pp. 242-244 (Feb. 1994).

Grunnet-Jepsen et al, Electon. Lett., vol. 35 No. 13 pp. 1096-1097 (Jun. 1999).

Paddon et al, Opt. Lett., vol. 23 No 19 pp. 1529-1531 (1998).

Madsen et al, IEEE J. Sel. Top. Quant. Elec., vol. 4 No. 6 pp. 925-929 (Nov./Dec. 1998).

Gini et al, J. Lighwave Tech., vol. 16 No. 4 pp. 625-630 (Ap. 1998).

Day et al, J. Lightwave Tech., vol. 14 No 8 pp. 1815-1824 (Aug. 1996).

McGreer, IEEE Photonics Tech. Lett., vol. 7 No. 3 pp. 324-326 (Mar. 1995).

Takenouchi et al, Optics Express, vol. 6 No. 6 pp. 124-135 (Mar. 2000).

Grunnett-Jepsen et al, Photonics Tech. Lett., vol. 11 No. 10 p. 1283 (Oct. 1999).

Babbit et al, Opt. Commun., vol. 148 pp. 23-26 (1998).

Brigham et al, Analysis of scattering from large planar gratings of compliant ctlindrical shells, J. Acoust. Soc. Am., vol. 61 No. 1 pp. 48-59 (Jan. 1977).

Kurokawa et al, Electon. Lett., vol. 33 No. 22 pp. 1890-1891 (Oct. 1997).

Sudbo et al, J. Lightwave Tech., vol. 8 No. 6 pp. 998-1006 (Jun. 1990).

Henry, J. Lightwave Tech., vol. 8 No. 5 pp. 748-755 (May 1990).

Koontz et al, Appl. Phys. Lett., vol. 71 No. 10 pp. 1400-1402 (Sep. 1997).

Song et al, Appl. Opt., vol. 34 No. 26 pp. 5913-5919 (Sep. 1995).

Brazas et al, Appl. Opt., vol. 34 No. 19 pp. 3786-3792 (Jul. 1995).

Bates et al, Appl. Opt., Vol. 32 No. 12 pp. 2112-2116 (Apr. 1993).

Wang et al, Appl. Opt., vol. 32 No. 14 pp. 2606-2613 (May 1993).

Magnusson et al, Appl. Phys. Lett., vol. 61 No. 9 pp. 1022-1024 (Aug. 1992).

Ojha et al, Demonstration of low loss integrated InGaAsP/InP demultiplexer device with low polarisation sensitivity, Electron. Lett., vol. 29 No. 9 p. 805 (Apr. 1993).

Li, Opt. Commun., vol. 114 pp. 406-412 (1995).

Soole et al, Electron. Lett., vol. 31 No. 15 pp. 1276-1277 (Jul. 1995).

Rantala et al, Electron. Lett. Vol. 34 No. 5 pp. 455-456 (Mar. 1998).

Cowin et al Electron. Lett., vol. 35 No. 13 pp. 1074-1076 (Jun. 1999).

Canning et al, Opt. Commun., vol. 171 pp. 213-217 (1999).

Tien et al, Use of concentric-arc grating as a thin-film spectrograph for guided waves, Am. Inst. of Physics (1980) pp. 524-525.

Kaneko et al, IEEE J. Sel. Top. Quant. Elec., vol. 5 No. 5 pp. 1227-1236 (Sep./Oct. 1999).

Sun et al, IEEE Photonics Tech. Lett., vol. 10 No. 1 pp. 90-92 (Jan. 1998).

McGreer, IEEE Photonics Tech. Lett., vol. 8 No. 4 pp. 551-553 (Apr. 1996).

Avrutsky et al, IEEE Photonics Tech. Lett., vol. 10 No. 6 pp. 839-841 (Jun. 1998).

Alavie et al, IEEE Photonics Tech. Lett., vol. 5 No. 9 pp. 1112-1114 (Sep. 1993).

Fu et al, Opt. Lett., vol. 22 No. 21 pp. 1627-1629 (1997).

Wang et al, IEEE Photonics Tech. Lett., vol. 3 No. 1 pp. 36-38 (Jan. 1991).

Wang et al Opt. Lett., vol. 15 No. 7 pp. 363-365 (Apr. 1990).

Wu et al, J. Lightwave Tech., vol. 10 No. 11 pp. 1575-1589 (Nov. 1992).

Eldada et al, IEEE Photonics Tech. Lett., vol. 12 No. 7 pp. 819-821 (Jul. 2000).

Chen et al, J. Lightwave Tech., vol. 10 No. 7 pp. 888-897 (Jul. 1992).

Minier et al, Diffraction characateristics of superimposed holographic gratings in planar optical waveguides, IEEE Photonics Tech. Lett., vol. 4 No. 10 p. 1115 (Oct. 1992).

Miya, IEEE J. Sel. Top. Quant. Elec., vol. 6 No. 1 pp. 38-45 (Jan./Feb. 2000).

Backlund et al, IEEE Photonics Tech. Lett., vol. 12 No. 3 pp. 314-316 (Mar. 2000).

Wiesman et al, IEEE Photonics Tech. Lett., vol. 12 No. 6 pp. 639-641 (Jun. 2000).

Ura et al, Integrated optical wavelength demultiplexer using a coplanar grating lens, Appl. Opt., vol. 29 No. 9 pp. 1369-1373 (Mar. 1990).

Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991).

Babbitt et al, Opt. Lett., vol. 20 No. 8 pp. 910-912 (Apr. 1995).

Mossberg, Opt. Lett., vol. 26, No. 7 pp. 414-416 (Apr. 2001).

Tang et al, A novel wavelength-division-demultiplexer with optical in-plane to surface-normal conversion, IEEE Photonics Tech. Lett., vol. 7 No. 8 p. 908 (Aug. 1995).

Brady et al, Applied Optics, vol. 30 No. 17 p. 2324 (Jun. 1991).

Preston, "Digital holographic logic", Pattern Recognition, vol. 5, p. 37 (1973).

Hirayama et al, Applied Physics Letters, vol. 69 No. 6 p. 791 (Aug. 5, 1996).

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjansson et al, IEEE Photonics Technology Letters, vol. 12 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).

* cited by examiner

RECONFIGURABLE OPTICAL ADD-DROP MULTIPLEXER INCORPORATING SETS OF DIFFRACTIVE ELEMENTS

BENEFIT CLAIMS TO RELATED APPLICATIONS

This application claims benefit of prior-filed co-pending provisional App. No. 60/666,042 filed Mar. 28, 2005, said provisional application being hereby incorporated by reference as if fully set forth herein.

BACKGROUND

The field of the present invention relates to optical add-drop multiplexers. In particular, disclosed herein are various embodiments of a reconfigurable optical add-drop multiplexer incorporating one or more sets of diffractive elements.

Various embodiments, implementations, and adaptations of planar optical waveguides with diffractive element sets are disclosed in:

Application Ser. No. 11/376,714, entitled "Etched surface gratings fabricated using computed interference between simulated optical signals and reduction lithography" filed Mar. 14, 2006 in the names of Thomas W. Mossberg, Dmitri Iazikov, and Christoph M. Greiner;

Application Ser. No. 11/371,339, entitled "Integrated optical sensor, measurement system and optical detection methods" filed Mar. 7, 2006 in the names of Dmitri Iazikov, Christoph M. Greiner, and Thomas W. Mossberg;

Application Ser. No. 11/361,407 filed Feb. 23, 2006 in the name of Thomas W. Mossberg;

Application Ser. No. 11/334,039 filed Jan. 17, 2006 in the names of Thomas W. Mossberg, Christoph M. Greiner, and Dmitri Iazikov;

Application Ser. No. 11/298,290 filed Dec. 9, 2005 in the names of Thomas W. Mossberg, Dmitri Iazikov, and Christoph M. Greiner;

Application Ser. No. 11/280,876 filed Nov. 15, 2005 in the names of Christoph M. Greiner, Dmitri Iazikov, and Thomas W. Mossberg;

Application Ser. No. 11/239,540 filed Sep. 28, 2005 in the name of Thomas W. Mossberg (now U.S. Pat. No. 7,009,743 issued Mar. 7, 2006);

Application Ser. No. 11/213,345 filed Aug. 25, 2005 in the names of Christoph M. Greiner, Dmitri Iazikov, and Thomas W. Mossberg;

Application Ser. No. 11/210,439 filed Aug. 23, 2005 in the names of Dmitri Iazikov, Christoph M. Greiner, and Thomas W. Mossberg;

Application Ser. No. 11/155,327 filed Jun. 16, 2005 in the names of Christoph M. Greiner, Thomas W. Mossberg, and Dmitri Iazikov;

Application Ser. No. 11/076,251 filed Mar. 8, 2005 in the name of Thomas W. Mossberg;

Application Ser. No. 11/062,109 filed Feb. 17, 2005 in the names of Christoph M. Greiner, Thomas W. Mossberg, and Dmitri Iazikov;

Application Ser. No. 11/055,559 filed Feb. 9, 2005 in the names of Christoph M. Greiner, Thomas W. Mossberg, and Dmitri Iazikov;

Application Ser. No. 11/021,549 filed Dec. 23, 2004 in the names of Dmitri Iazikov, Christoph M. Greiner, and Thomas W. Mossberg;

Application Ser. No. 10/998,185 filed Nov. 26, 2004 in the names of Dmitri Iazikov, Christoph M. Greiner, and Thomas W. Mossberg (now U.S. Pat. No. 6,993,223 issued Jan. 31, 2006);

Application Ser. No. 10/989,244 filed Nov. 15, 2004 in the names of Christoph M. Greiner, Thomas W. Mossberg, and Dmitri Iazikov (now U.S. Pat. No. 6,961,491 issued Nov. 1, 2005);

Application Ser. No. 10/989,236 filed Nov. 15, 2004 in the names of Christoph M. Greiner, Dmitri Iazikov, and Thomas W. Mossberg (now U.S. Pat. No. 6,965,716 issued Nov. 15, 2005);

Application Ser. No. 10/923,455 filed Aug. 21, 2004 in the names of Thomas W. Mossberg, Dmitri Iazikov, and Christoph M. Greiner;

Application Ser. No. 10/898,527 filed Jul. 22, 2004 in the named of Dmitri Iazikov, Christoph M. Greiner, and Thomas W. Mossberg;

Application Ser. No. 10/857,987 filed May 29, 2004 in the names of Lawrence D. Brice, Christoph M. Greiner, Thomas W. Mossberg, and Dmitri Iazikov (now U.S. Pat. No. 6,990,276 issued Jan. 24, 2006);

Application Ser. No. 10/842,790 filed May 11, 2004 in the names of Thomas W. Mossberg, Christoph M. Greiner, and Dmitri Iazikov (now U.S. Pat. No. 6,987,911 issued Jan. 17, 2006);

Application Ser. No. 10/798,089 filed Mar. 10, 2004 in the names of Christoph M. Greiner, Thomas W. Mossberg, and Dmitri Iazikov (now U.S. Pat. No. 6,823,115 issued Nov. 23, 2004);

Application Ser. No. 10/794,634 filed Mar. 5, 2004 in the names of Dmitri Iazikov, Thomas W. Mossberg, and Christoph M. Greiner (now U.S. Pat. No. 6,985,656 issued Jan. 10, 2006);

Application Ser. No. 10/740,194 filed Dec. 17, 2003 in the names of Dmitri Iazikov, Thomas W. Mossberg, and Christoph M. Greiner;

Application Ser. No. 10/653,876 filed Sep. 2, 2003 in the names of Christoph M. Greiner, Dmitri Iazikov, and Thomas W. Mossberg (now U.S. Pat. No. 6,829,417 issued Dec. 7, 2004);

Application Ser. No. 10/602,327 filed Jun. 23, 2003 in the name of Thomas W. Mossberg (now U.S. Pat. No. 6,859,318 issued Feb. 22, 2005);

Application Ser. No. 10/229,444 filed Aug. 27, 2002 in the names of Thomas W. Mossberg and Christoph M. Greiner (now U.S. Pat. No. 6,678,429 issued Jan. 13, 2004);

Application Ser. No. 09/843,597 filed Apr. 26, 2001 in the name of Thomas W. Mossberg (now U.S. Pat. No. 6,965,464 issued Nov. 15, 2005);

Application Ser. No. 09/811,081 filed Mar. 16, 2001 in the name of Thomas W. Mossberg (now U.S. Pat. No. 6,879,441 issued Apr. 12, 2005).

Each of said applications and patents is hereby incorporated by reference as if fully set forth herein. For one or more of the references incorporated hereinabove, it may be the case that the devices, structures, embodiments, implementations, adaptations, procedures, or techniques disclosed therein may be employed, within the scope of the present disclosure or appended claims, for implementing a reconfigurable optical add-drop multiplexer incorporating one or more diffractive element sets.

SUMMARY

An exemplary reconfigurable optical add-drop multiplexer (R-OADM) comprises: a slab optical waveguide; a first group of multiple diffractive element sets formed in or on the slab waveguide; a second group of multiple diffractive element sets formed in or on the slab waveguide; and a group of multiple channel waveguides. Each channel waveguide of the group is arranged for routing an optical signal between a corresponding diffractive element set of the first group and a corresponding diffractive element set of the second group. Each channel waveguide of the group includes corresponding means for back-reflecting an optical signal propagating along the waveguide. Each back-reflecting means is switchable between a transmitting operational state and a reflecting operational state independently of operational states of the other back-reflecting means. Each diffractive element set of the first group is arranged so as to route an optical signal within a corresponding wavelength band between a first optical port and the corresponding channel waveguide; each diffractive element set of the second group is arranged so as to route the optical signal within the corresponding wavelength band between a second optical port and the corresponding channel waveguide.

Each diffractive element set of the first group, the corresponding channel waveguide, and the corresponding diffractive element set of the second group are arranged so as to route an optical signal entering the slab waveguide through the first optical port within the corresponding wavelength band to the corresponding channel waveguide, transmit through the corresponding channel waveguide the optical signal thus routed if the corresponding back-reflecting means is in the transmitting operational state, and route the optical signal thus transmitted to exit through the second optical port. In addition: each diffractive element set of the first group and the corresponding channel waveguide are arranged so as to route an optical signal entering the slab waveguide through the first optical port within the corresponding wavelength band to the corresponding channel waveguide, back-reflect within the corresponding channel waveguide the optical signal thus routed if the corresponding back-reflecting means is in the reflecting operational state, and route the optical signal thus back-reflected to exit through the first optical port; or each diffractive element set of the second group and the corresponding channel waveguide are arranged so as to route an optical signal entering the slab waveguide through the second optical port within the corresponding wavelength band to the corresponding channel waveguide, back-reflect within the corresponding channel waveguide the optical signal thus routed if the corresponding back-reflecting means is in the reflecting operational state, and route the optical signal thus back-reflected to exit through the second optical port.

An exemplary method for using this R-OADM comprises: independently setting each back-reflecting means to either the reflecting operational state or the transmitting operational state; receiving into the slab waveguide an input optical signal entering through the first optical port; and receiving from the second optical port each corresponding wavelength channel of the input optical signal for which the corresponding back-reflecting means is in the transmitting operational state. An exemplary method may further comprise: receiving from the first optical port each corresponding wavelength channel of the first input optical signal for which the corresponding back-reflecting means is in the reflecting operational state; or receiving into the slab waveguide a second optical signal entering through the second optical port, and receiving from the second optical port each corresponding wavelength channel of the second input optical signal for which the corresponding back-reflecting means is in the reflecting operational state. An exemplary method for forming the R-OADM comprises: forming the first group of multiple diffractive element sets in or on a slab waveguide; forming the second group of multiple diffractive element sets in or on the slab waveguide; and forming the group of multiple channel waveguides waveguide, including the corresponding switchable back-reflecting means.

Another exemplary R-OADM comprises: a slab optical waveguide; a first group of multiple diffractive element sets formed in or on the slab waveguide; a second group of multiple diffractive element sets formed in or on the slab waveguide; a first group of multiple channel waveguides; a second group of multiple channel waveguides; and a group of multiple optical switches each independently switchable between a non-switched operational state and a switched operational state. Each channel waveguide of the first group is arranged for routing an optical signal between a corresponding diffractive element set of the first group and a corresponding diffractive element set of the second group. Each channel waveguide of the second group is arranged for routing an optical signal from a corresponding one of multiple add optical ports or to a corresponding one of multiple drop optical ports. Each set of diffractive elements of the first group is arranged so as to route an optical signal within a corresponding wavelength band between a first optical port and the corresponding channel waveguide of the first group; each set of diffractive elements of the second group is arranged so as to route an optical signal within the corresponding wavelength band between a second optical port and the corresponding channel waveguide of the first group.

Each channel waveguide of the first group is coupled to a corresponding channel waveguide of the second group by a corresponding one of the multiple optical switches. Each diffractive element set of the first group, the corresponding channel waveguide of the first group, and the corresponding diffractive element set of the second group are arranged so as to route an optical signal entering the slab waveguide through the first optical port within the corresponding wavelength band to the corresponding channel waveguide of the first group, transmit through the corresponding channel waveguide of the first group the optical signal thus routed if the corresponding optical switch is in the non-switched operational state, and route the optical signal thus transmitted to exit through the second optical port. In addition: each diffractive element set of the first group, the corresponding channel waveguide of the first group, and the corresponding channel waveguide of the second group are arranged so as to route an optical signal entering the slab waveguide through the first optical port within the corresponding wavelength band to the corresponding channel waveguide of the first group, switch into the corresponding channel waveguide of the second group the optical signal thus routed if the corresponding optical switch is in the switched operational state, and transmit the optical signal thus switched to exit through the corresponding drop optical port; or each diffractive element set of the second group, the corresponding channel waveguide of the first group, and the corresponding channel waveguide of the second group are arranged so as to route an optical signal within the corresponding wavelength band entering the corresponding channel waveguide of the second group through the corresponding add optical port to the corresponding optical switch, switch into the corresponding channel waveguide of the first group the optical signal thus routed if the corresponding optical switch is in the switched operational state, and transmit the optical signal thus switched to exit through the second optical port.

An exemplary method for using this R-OADM comprises: independently setting each one of the group of multiple optical switches to either the non-switched operational state or the switched operational state; receiving into the slab optical waveguide an input optical signal entering through the first optical port and comprising multiple wavelength channels within corresponding wavelength bands; and receiving from the second optical port each corresponding wavelength channel of the input optical signal for which the corresponding optical switch is in the non-switched operational state. An exemplary method may further comprise: receiving from the corresponding drop optical port each corresponding wavelength channel of the input optical signal for which the corresponding optical switch is in the switched operational state; or receiving into the corresponding add optical port an added optical signal within the corresponding wavelength band, and receiving from the second optical port the added optical signal if the corresponding optical switch is in the switched operational state. An exemplary method for forming the R-OADM comprises: forming the first group of multiple diffractive element sets in or on a slab waveguide; forming the second group of multiple diffractive element sets in or on the slab waveguide; forming the first group of multiple channel waveguides; forming the second group of multiple channel waveguides; and forming the group of multiple independently switchable optical switches.

Objects and advantages pertaining to reconfigurable optical add-drop multiplexers incorporating diffractive element sets and methods of use and fabrication thereof may become apparent upon referring to the exemplary embodiments illustrated in the drawings and disclosed in the following written description or appended claims.

Figure 1:
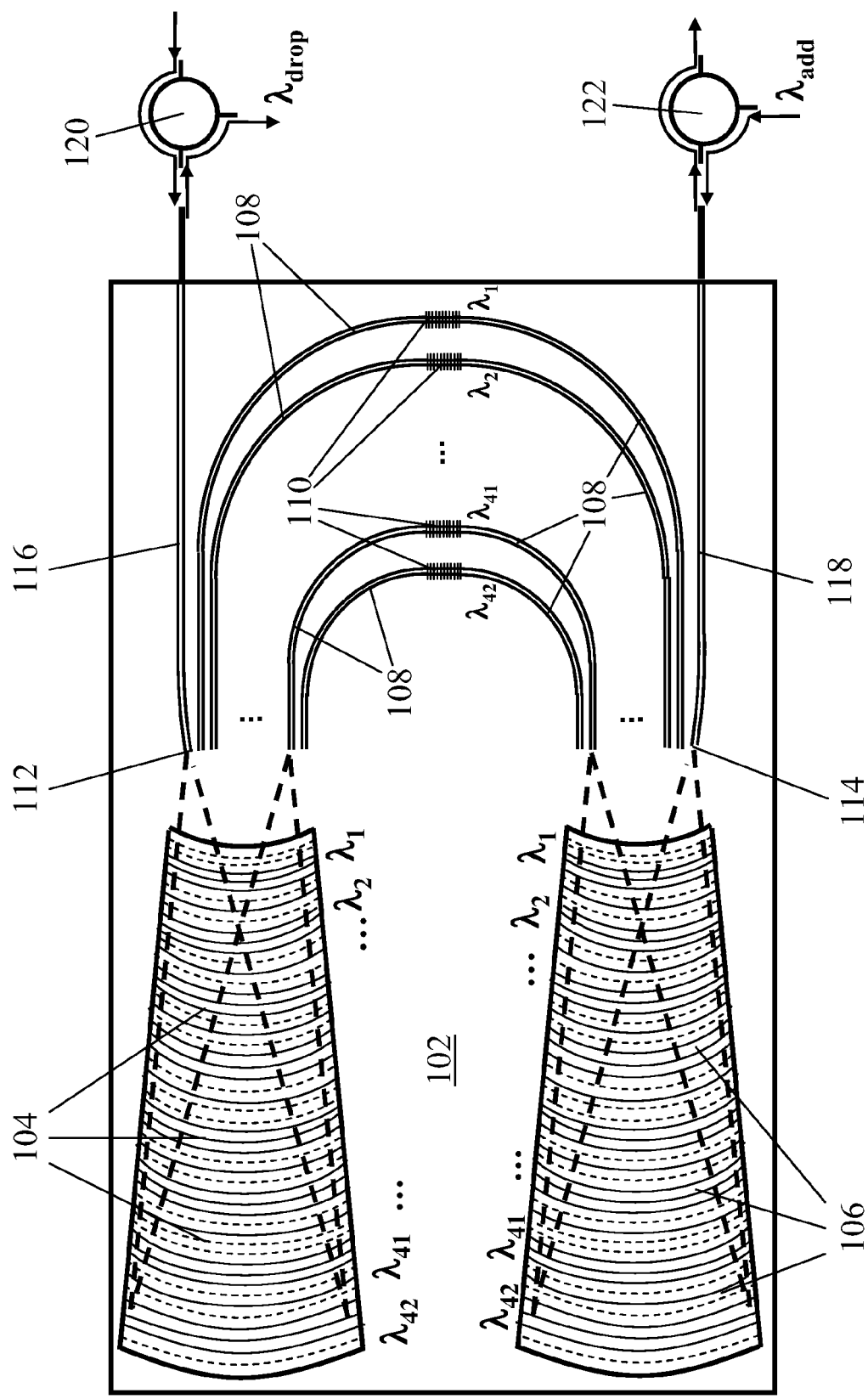
FIG. 1 illustrates schematically an exemplary embodiment of a reconfigurable optical add-drop multiplexer.

The embodiments shown in the Figures are exemplary, and should not be construed as limiting the scope of the present disclosure and/or appended claims.

DETAILED DESCRIPTION OF EMBODIMENTS

A planar optical waveguide is generally formed on or from a substantially planar substrate of some sort. The confined optical signals typically propagate as transverse optical modes supported or guided by the planar waveguide. These optical modes are particular solutions of the electromagnetic field equations in the space occupied by the waveguide. The planar waveguide may comprise a slab waveguide (substantially confining in one transverse dimension an optical signal propagating in two dimensions therein), or may comprise a channel waveguide (substantially confining in two transverse dimension an optical signal propagating in one dimension therein). It should be noted that the term "planar waveguide" is not used consistently in the literature; for the purposes of the present disclosure and/or appended claims, the term "planar waveguide" is intended to encompass both slab and channel waveguides.

The planar waveguide typically comprises a core surrounded by lower-index cladding (often referred to as upper and lower cladding, or first and second cladding; these may or may not comprise the same materials). The core is fabricated using one or more dielectric materials substantially transparent over a desired operating wavelength range. In some instances one or both claddings may be vacuum, air, or other ambient atmosphere. More typically, one or both claddings comprise layers of dielectric material(s), with the cladding refractive indices $n_1$ and $n_2$ typically being smaller than the core refractive index $n_{core}$. (In some instances in which short optical paths are employed and some degree of optical loss can be tolerated, the cladding indices might be larger than the core index while still enabling the planar waveguide to support guided, albeit lossy, optical modes.) A planar waveguide may support one or more transverse modes, depending on the dimensions and refractive indices of the core and cladding. A wide range of material types may be employed for fabricating a planar waveguide, including but not limited to glasses, polymers, plastics, semiconductors, combinations thereof, and/or functional equivalents thereof. The planar waveguide may be secured to a substrate for facilitating manufacture, for mechanical support, and/or for other reasons. A planar waveguide typically supports or guides one or more optical modes characterized by their respective amplitude variations along the confined dimension.

The set of diffractive elements of the planar optical waveguide may also be referred to as: a set of holographic elements; a volume hologram; a distributed reflective element, distributed reflector, or distributed Bragg reflector (DBR); a Bragg reflective grating (BRG); a holographic Bragg reflector (HBR); a holographic optical processor (HOP); a programmed holographic structure (PHS); a directional photonic-bandgap structure; a mode-selective photonic crystal; or other equivalent terms of art. Each diffractive element of the set may comprise one or more diffracting regions thereof that diffract, reflect, scatter, route, or otherwise redirect portions of an incident optical signal (said process hereinafter simply referred to as diffraction). For a planar waveguide, the diffracting regions of each diffractive element of the set typically comprises some suitable alteration of the planar waveguide (ridge, groove, index modulation, density modulation, and so on), and is spatially defined with respect to a virtual one- or two-dimensional linear or curvilinear diffractive element contour, the curvilinear shape of the contour typically being configured to impart desired spatial characteristics onto the diffracted portion of the optical signal. For an optical element enabling propagation in three dimensions, the virtual diffractive element contour may be an areal contour. Implementation of a diffractive element with respect to its virtual contour may be achieved in a variety of ways, including those disclosed in the references cited hereinabove. Each areal, linear, or curvilinear diffractive element is shaped to direct its diffracted portion of the optical signal to an output optical port, which may be in or out of a plane defined by the diffractive elements. The relative spatial arrangement (e.g. longitudinal spacing) of the diffractive elements of the set, and the relative amplitude diffracted from each diffractive element of the set, yield desired spectral and/or temporal characteristics for the overall diffracted optical signal routed between the corresponding input and output optical ports. It should be noted that optical ports (input and/or output) may be defined structurally (for example, by an aperture, waveguide, fiber, lens, or other optical component) and/or functionally (for example, by a spatial location, convergence/divergence/collimation, and/or propagation direction). For a single-mode planar waveguide, such a set of diffractive elements may be arranged to yield an arbitrary spectral/temporal transfer function (in terms of amplitude and phase). In a multimode planar waveguide, modal dispersion and mode-to-mode coupling of diffracted portions of the optical signal may limit the range of spectral/temporal transfer functions that may be implemented.

The diffractive elements of the set (or equivalently, their corresponding contours) are spatially arranged with respect to one another so that the corresponding portions of the optical signal diffracted by each element interfere with one another at the output optical port, so as to impart desired spectral and/or temporal characteristics onto the portion of the optical signal collectively diffracted from the set of diffractive elements and routed between the input and output optical ports. The diffractive elements in the set are arranged so that an input optical signal, entering the planar waveguide through an input optical port, is successively incident on diffractive elements of the set. For the purposes of the present disclosure and/or appended claims, "successively incident" shall denote a situation wherein a wavevector at a given point on the wavefront of an optical signal (i.e., a wavefront-normal vector; sometimes referred to as a "portion" of the spatial wavefront) traces a path (i.e., a "ray path") through the diffractive element set that successively intersects the virtual contours of diffractive elements of the set. Such wavevectors at different points on the wavefront may intersect a given diffractive element virtual contour at the same time or at differing times; in either case the optical signal is considered "successively incident" on the diffractive elements. A fraction of the incident amplitude is diffracted by a diffractive element and the remainder transmitted and incident on another diffractive element, and so on successively through the set of diffractive elements. The diffractive elements may therefore be regarded as spaced substantially longitudinally along the propagation direction of the incident optical signal, and a given spatial portion of the wavefront of such a successively incident optical signal therefore interacts with many diffractive elements of the set. (In contrast, the diffractive elements of a thin diffraction grating, e.g. the grating lines of a surface grating, may be regarded as spaced substantially transversely across the wavefront of a normally incident optical signal, and a given spatial portion of the wavefront of such a signal therefore interacts with only one or at most a few adjacent diffractive elements).

As described in detail in U.S. Pat. No. 6,993,223 (cited and incorporated by reference hereinabove), diffracting regions of a diffractive element set may be distributed over one of more spatial regions of the optical element, for facilitating placement of multiple diffractive element sets in a single optical element. These spatial regions may be positioned and arranged so as to impart desired spatial, spectral, or temporal characteristics onto the corresponding routed portions of an incident optical signal. Such arrangement may include an optical signal being successively incident on multiple spatial regions of a diffractive element set, with "successively incident" defined as set forth hereinabove. The word "primitive" may be used to designate one diffractive element set among multiple diffractive element sets in a single optical element (e.g., a single optical device may include multiple "primitive programmed holographic structures").

The set of diffractive elements provides dual functionality, spatially routing an optical signal between an input optical port and an output optical port, while at the same time acting to impart a spectral/temporal transfer function onto the diffracted portion of an input optical signal to yield an output optical signal. The diffractive elements may be designed (by computer generation, for example) so as to provide optimal routing, imaging, or focusing of the optical signal between an input optical port and a desired output optical port, thus reducing or minimizing insertion loss. Simple areal, linear, or curvilinear diffractive elements (segments of circles, spheres, ellipses, ellipsoids, parabolas, paraboloids, hyperbolas, hyperboloids, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited and incorporated by reference hereinabove. The following are exemplary only, and are not intended to be exhaustive.

Diffractive elements may be formed lithographically on the surface of a planar optical waveguide, or at one or both interfaces between core and cladding of a planar optical waveguide. Diffractive elements may be formed lithographically in the interior of the core layer and/or a cladding layer of the planar optical waveguide using one or more spatial lithography steps performed after an initial partial deposition of layer material. Diffractive elements may be formed in the core and/or cladding layers by projecting ultraviolet light or other suitable radiation through an amplitude and/or phase mask so as to create an interference pattern within the planar waveguide (fabricated at least in part with suitably sensitive material) whose fringe contours match the desired diffractive element contours. Alteration of the refractive index by exposure to ultraviolet or other radiation results in index-modulated diffractive elements. The mask may be zeroth-order-suppressed according to methods known in the art, including the arts associated with fabrication of fiber Bragg gratings. The amplitude and/or phase mask may be produced lithographically via laser writer or e-beam, it may be interferometrically formed, or it may be formed by any other suitable technique. In instances where resolution is insufficient to produce a mask having required feature sizes, a larger scale mask may be produced and reduced to needed dimensions via photoreduction lithography, as in a stepper, to produce a mask at the needed scale. Diffractive elements may be formed by molding, stamping, impressing, embossing, or other mechanical processes. A phase mask may be stamped onto the core or cladding surface followed by optical exposure to create diffractive elements throughout the core and or cladding region. The optical or UV source used to write the diffractive elements in this case should have a coherence length comparable or longer than the distance from the stamped phase mask to the bottom of the core region. Stamping of the phase mask directly on the device may simplify alignment of diffractive elements with ports or other device components especially when those components may be formed in the same or another stamping process. Many approaches to the creation of refractive index modulations or gratings are known in the art and may be employed in the fabrication of diffractive element sets.

Irradiation-produced refractive index modulations or variations for forming diffractive elements will optimally fall in a range between about $10^{-4}$ and about $10^{-1}$; however, refractive index modulations or variations outside this range may be employed as well. Refractive index modulations or variations may be introduced by light of any wavelength (including ultraviolet light) that produces the desired refractive index changes, provided only that the photosensitive material employed is suitably stable in the presence of light in the desired operating wavelength range of the spectral filter. Exposure of a complete set of diffractive elements to substantially spatially uniform, refractive-index-changing light may be employed to tune the operative wavelength range of the diffractive element set. Exposure of the diffractive element set to spatially non-uniform refractive-index changing light may be employed to chirp or otherwise wavelength-modulate the spectral filter (described further hereinbelow). The sensitivity of planar waveguide materials to irradiation produced refractive index modulations may be increased using hydrogen-loading, flame-brushing, boron or other chemical doping, or other method known in the art, for example in the context of making fiber Bragg gratings.

The curvilinear shape of the diffractive element contours may be determined by a variety of standard optical imaging system design tools. Essentially, each diffractive element contour may be optimized to image the input port onto the output port in a phase coherent manner. In some instances, interference among signals diffracted by multiple diffractive elements may contribute to image formation; this may be the case particularly when the diffracted signals propagate out of a plane defined by the diffractive elements. Inputs to the design are the detailed structure of the input and output optical ports and their locations. Standard ray tracing approaches to optical element design may provide a diffractive contour at each optical distance into the planar waveguide that will provide an optimal imaging of the input signal at the input port onto the optimal output signal at the output port. Simple curves may be employed as approximations of the fully optimized contours. Diffractive element virtual contours may be spaced by an optical path difference (as described above) that provides for the field image of successive diffractive contours to be substantially in phase at a desired wavelength. If the overall response of the diffractive element set is to be apodized with amplitude and/or phase modulation (to yield a desired spectral transfer function or impulse response function), the optical spacing of successive diffractive element contours may be controlled to provide required phase differences between diffracted components at the output port, and/or the diffractive strength of the elements may be individually controlled as well (as described in detail in the references cited hereinabove; also described for certain cases in: T. W. Mossberg, "Planar holographic optical processing devices", *Optics Letters v26* p 414 (2001), said publication being hereby incorporated by reference as if fully set forth herein).

An alternative approach to designing the diffractive element contours for a diffractive element set is to calculate interference patterns between simulated fields at a desired wavelength and with desired waveforms entering the input port and exiting the output port. In forming or writing a summed pattern for the diffractive element set, suitable discretization is applied as needed for any lithographic or UV exposure approach that is utilized for fabrication. The holographic structure may be designed by interference of computer-generated beams having the desired computer-generated temporal waveforms, with the resulting calculated arrangement of diffractive elements implemented by lithography and/or other suitable spatially-selective fabrication techniques. For example, interference between a delta-function-like pulse and a desired reference optical waveform (or its time-reverse) may be calculated, and the resulting interference pattern used to fabricate a diffractive element set that acts to either recognize or generate the desired reference optical waveform.

In an alternative method for making the diffractive element structure, the optical element may include material of appropriate index that is also photosensitive at the wavelength of the desired operational signal beams. As in traditional holography, the input and output recording beams (same wavelength as operational signal beams of the envisioned device) are overlapped in the optical element and the interference pattern between them is recorded. Subsequently the photosensitive material is developed and, if necessary, a cladding may be deposited or attached by other means.

As mentioned in above-cited U.S. Pat. Nos. 6,879,441 and 6,859,318 and U.S. application Ser. No. 11/076,251, inter alia, a single optical apparatus may have multiple primitive sets of diffractive elements. These primitive diffractive element sets may occupy spatial regions in an optical element that are the same, are partially overlapping, or are substantially non-overlapping. More specifically, multiple primitive diffractive element sets may be: i) "stacked" (i.e., positioned one after another along an optical propagation direction from an input port of the optical element); ii) "interleaved" (i.e., the optical element has spatial regions containing diffracting regions of one primitive diffractive element set but no diffracting regions of another primitive diffractive element set; the various spatial regions containing the diffracting regions of a primitive diffractive element set may not be contiguous, but are coherent; the spatial regions may border on other spatial regions containing diffracting regions of other primitive diffractive element sets); iii) overlaid (i.e., the diffracting regions of multiple primitive diffractive element sets occupy a common spatial region); or iv) combined in a common optical element using a combination of these methods. It may be desirable to combine multiple primitive diffractive element sets to create an optical apparatus with multiple outputs and/or inputs, to more efficiently utilize device area, or to meet specific design requirements.

Overlaid primitive diffractive element sets are described in above-cited U.S. Pat. Nos. 6,678,429, 6,829,417, and 6,965,716 and U.S. application Ser. No. 11/280,876. If the fill-factors of diffracting regions of the diffractive elements are sufficiently low (upon implementation of partial-fill grayscale or other apodization technique, for example, as described in the preceding references), then multiple primitive diffractive element sets may be formed in a common spatial region of an optical element with a low probability that diffracting regions of different primitive diffractive element sets would spatially overlap. Such overlap that would occur may be inconsequential, or may be eliminated to any desired degree by element-by-element movement of individual diffracting regions, if desired. At higher fill-factors, a more deterministic approach may be employed for ensuring that diffracting regions for the respective diffractive element sets do not spatially coincide. Depending on the fabrication technique, such considerations may not be necessary. For fabrication by binary lithography, two diffracting regions cannot overlap and function properly. A particular location of the optical element is either etched or not; an optical signal interacts at that location in the same way whether the location was etched to form a single diffracting region or multiple diffracting regions. Fabrication techniques wherein a material response is substantially linear, such as forming diffracting regions by photo-exposure or grayscale lithography, enable formation of diffracting regions that may spatially overlap while each properly fulfills its function. As long as the material response (to the fabrication technique) is substantially linear, a particular location of the optical element will interact differently with an optical signal according to whether it was exposed to form one diffracting regions, two diffracting regions, and so on. For such linear (i.e., grayscale) fabrication techniques, diffractive element sets may be overlaid without regard for fill factor.

Interleaving of multiple primitive diffractive element sets refers to individual primitive diffractive element sets that occupy inter-mixed but substantially non-overlapping spatial regions of an optical element, and is described extensively in above-cited U.S. Pat. No. 6,993,223. Interleaving may be used along with or without other variations of implementing diffracting regions of the diffractive elements (including partial-fill, width-based, line-density, facet-displacement, and element-displacement grayscale methods, other apodization techniques, and so forth). Multiple spatial regions for each of the primitive diffractive element sets may be thought of as forming a "patchwork" over the optical element. Stacking of primitive diffractive element sets might be regarded as the simplest example of interleaving (for which the descriptor "interleaving" may not necessarily even be appropriate), with each primitive diffractive element set occupying a single distinct spatial region of the optical element, and with the spatial regions arranged sequentially along a propagation direction of optical signals (i.e., "stacked"). An incident optical signal is successively incident on each spatial region, and therefore also on each primitive diffractive element set.

True interleaving (i.e., not stacking) may enable improved spectral resolution compared to an optical device of the same overall length with stacked primitive diffractive element sets. It should be noted that in the low to moderate reflection strength case, the spectral resolution $\Delta f_{res}$ (the spectral width of the main reflection maximum) of an unapodized primitive diffractive element set is inversely proportional to the maximal optical path length difference between interfering light beams diffracted by the various diffractive elements of the primitive set. If N primitive programmed holographic structures are stacked and occupy substantially equal portions of a total device length L, the resolution of each primitive diffractive element set is limited by the length L/N. If, on the other hand, N primitive diffractive element sets are each divided into multiple spatial regions, and the spatial regions interleaved so that regions of each primitive set are distributed along the entire length L of the optical element, then the resolution of each primitive diffractive element set would be limited by L. Spatial regions of each primitive diffractive element set may or may not extend across the entire transverse extent of the interleaved multiple diffractive element sets. It is assumed that the various spatial regions of the primitive diffractive element sets are coherent except for phase shifts introduced as part of an overall apodization.

Various adaptation are disclosed and/or claimed in above-cited U.S. Pat. No. 6,993,223 for reducing, minimizing, or substantially eliminating unwanted spatial or spectral characteristics from routed portions of an incident optical signal that may arise due to interleaving of multiple primitive diffractive element sets. These may be achieved by positioning and arranging the spatial regions occupied the primitive diffractive element sets or by control over the refractive index of the optical element as a function of position.

In the following discussion, the depth direction (i.e., propagation direction of an incident optical signal) refers to the direction normal to the phase front of the input beam, while the transverse direction refers to the direction along the phase front of the input beam (perpendicular to the input beam propagation direction). Note that these direction are defined locally for each portion of the spatial wavefront, which is generally curved.

Figure 2:
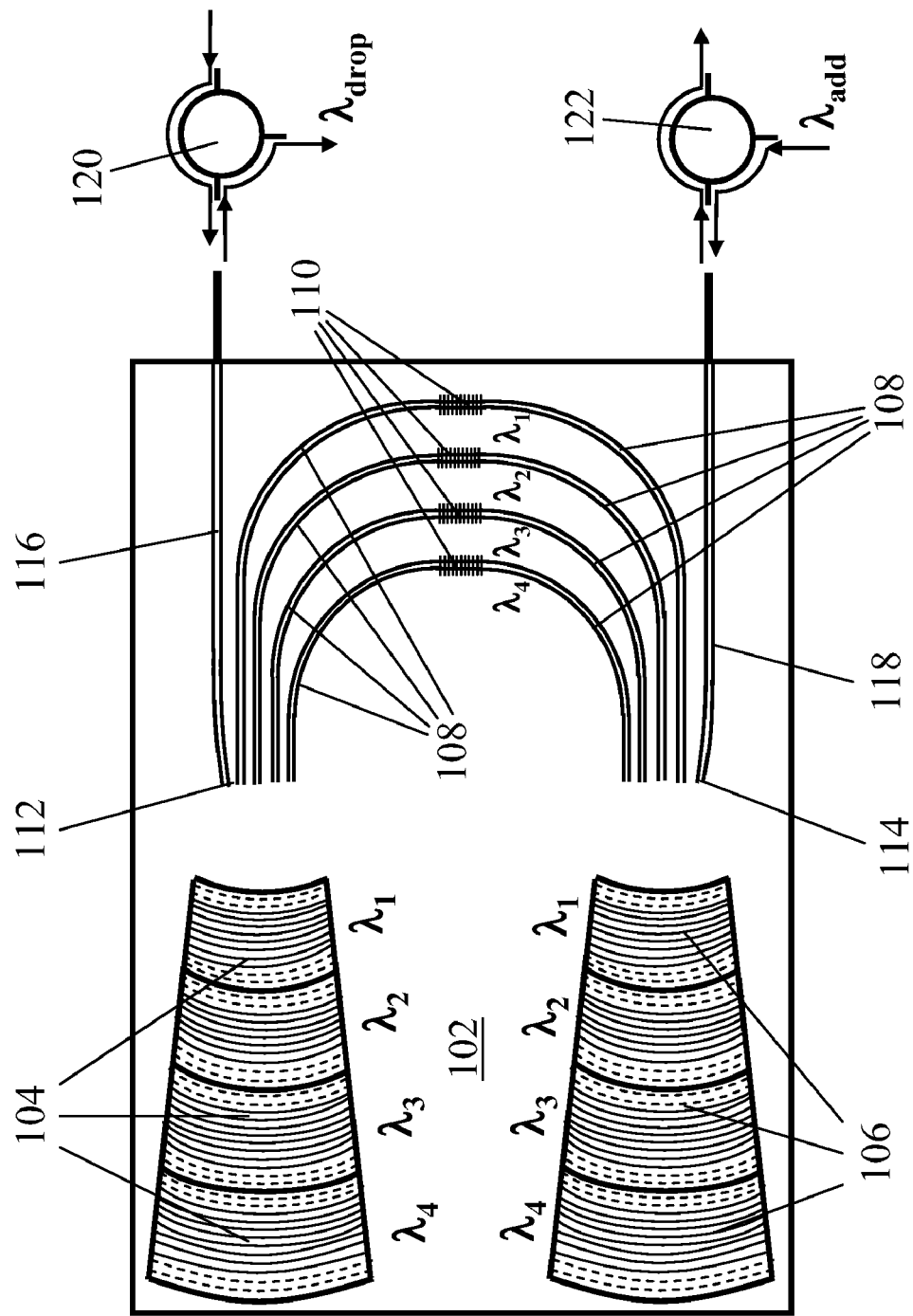
FIG. 2 illustrates schematically another exemplary embodiment of a reconfigurable optical add-drop multiplexer.

An exemplary reconfigurable optical add-drop multiplexer (R-OADM) is illustrated schematically in FIGS. 1 and 2, and comprises: a slab optical waveguide 102; a first group of multiple diffractive element sets 104 formed in or on slab waveguide 102; a second group of multiple diffractive element sets 106 formed in or on slab waveguide 102; and a group of multiple channel waveguides 108 integrally formed with slab waveguide 102. Each channel waveguide 108 of the group is arranged for routing an optical signal between a corresponding diffractive element set 104 of the first group and a corresponding diffractive element set 106 of the second group. Each channel waveguide 108 of the group includes a corresponding means 110 for back-reflecting an optical signal propagating along waveguide 108. Each back-reflecting means 110 is switchable between a transmitting operational state and a reflecting operational state independently of operational states of the other back-reflecting means. In FIGS. 1 and 2 slab waveguide 102, including the first group of diffractive element sets 104 and the second group of diffractive element sets 106, and the channel waveguides 108 with waveguide gratings 110 are all integrated onto a common waveguide substrate. It may be desirable in some instances for the slab waveguide with the first group of diffractive element sets 104, the slab waveguide with the second group of diffractive element sets 106, or the channel waveguides 108 with waveguide gratings 110 to be formed on a separate waveguide substrate, with the channel waveguides and diffractive element sets optically coupled as needed using optical fibers or other suitable means. This may be desirable for mechanically or thermally decoupling the diffractive element sets from the waveguide gratings, for example.

Each diffractive element set 104 of the first group is arranged so as to route an optical signal within a corresponding wavelength band between a first optical port 112 and the corresponding channel waveguide 108, and each diffractive element set 106 of the second group is arranged so as to route the optical signal within the corresponding wavelength band between a second optical port 114 and the corresponding channel waveguide 108. Each diffractive element set 104 of the first group, corresponding channel waveguide 108, and corresponding diffractive element set 106 of the second group are arranged so as to route an optical signal entering slab waveguide 102 through optical port 112 within the corresponding wavelength band to corresponding channel waveguide 108, transmit through corresponding channel waveguide 108 the optical signal thus routed if the corresponding back-reflecting means 110 is in the transmitting operational state, and route the optical signal thus transmitted to optical port 114 as a "thru" or "express" signal channel. To function as a channel-dropping demultiplexer, each diffractive element set 104 of the first group and corresponding channel waveguide 108 are arranged so as to route an optical signal entering slab waveguide 102 through optical port 112 within the corresponding wavelength band to corresponding channel waveguide 108, back-reflect within corresponding channel waveguide 108 the optical signal thus routed if corresponding back-reflecting means 110 is in the reflecting operational state, and route the optical signal thus back-reflected back to optical port 112 as a dropped signal channel. To function as a channel-adding multiplexer, each diffractive element set 106 of the second group and corresponding channel waveguide 108 are arranged so as to route an optical signal entering the slab waveguide through optical port 114 within the corresponding wavelength band to corresponding channel waveguide 108, back-reflect within corresponding channel waveguide 108 the optical signal thus routed if corresponding back-reflecting means 110 is in the reflecting operational state, and route the optical signal thus back-reflected to optical port 114 as an added signal channel. The R-OADM of FIG. 1 or 2 may function as both a channel-adding multiplexer and as a channel-dropping demultiplexer simultaneously, if needed or desired.

The diffractive element sets 104 and 106 of the two groups may be arranged in any suitable way, including those disclosed in various of the references cited hereinabove. For example, each diffractive element of at least one set 104 or 106 may be individually contoured and positioned so as to preferentially route a portion of an incident optical signal between the corresponding optical port 112 or 114 and corresponding channel waveguide 108 as the optical signal propagates within slab waveguide 102. Diffractive elements of a set 104 or 106 may also be collectively arranged so as to exhibit a positional variation in amplitude, optical separation, or spatial phase over some portion of the set. In another example, each diffractive element of at least one set 104 or 106 may diffract a corresponding diffracted component of an incident optical signal with a corresponding diffractive element transfer function between optical port 112 or 114 and corresponding channel waveguide 108. Each such diffractive element may comprise at least one diffracting region having at least one altered optical property so as to enable diffraction of a portion of the incident optical signal, and such diffracting regions may be arranged so as to collectively provide a corresponding diffractive element transfer function between optical port 112 or 114 and corresponding channel waveguide 108. The multiple diffractive element sets 104 or 106 may be at least partly stacked, at least partly interleaved, or at least partly overlaid, as disclosed in various of the above-cited references.

An optical channel waveguide 116 may be integrally formed with slab waveguide 102 and positioned and adapted for transmitting an optical signal to optical port 112 or for receiving an optical signal from optical port 112. Similarly, an optical channel waveguide 118 may be integrally formed with slab waveguide 102 and positioned and adapted for transmitting an optical signal to optical port 114 or for receiving an optical signal from optical port 114.

The R-OADM may further comprise one of more optical circulators for separating counter-propagating optical signals transmitted into or out of the optical ports 112 and 114. In the examples of FIGS. 1 and 2, a first circulator 120 is employed for separating optical signals entering optical port 112 from an optical signal exiting optical port 112 (i.e. the dropped optical signal channel). Similarly, a second circulator 122 is employed for separating an optical signal entering optical port 114 (i.e. the added optical signal channel) from an optical signal exiting optical port 114 (i.e. the "express" or "thru" optical signal channels). Any other suitable means may be employed for separating optical signals transmitted to or from the R-OADM.

A typical use for the R-OADM is in an optical telecommunications system employing wavelength division multiplexing (WDM). WDM is a well-known technique and will not be described further herein. The corresponding wavelength bands or wavelength channels recited herein for describing the operation of the R-OADM may typically comprise channels of a WDM scheme or protocol. One example of such a scheme is the set of optical carrier frequencies (or wavelengths) defined in various standards of the International Telecommunications Union (ITU). For example, the 42 separate wavelength bands schematically illustrated in FIG. 1 may correspond to the 42 wavelength channels of the 100 GHz ITU WDM C-band. The example illustrated schematically in FIG. 2 may handle up to four wavelength bands. Any suitable set of wavelength bands or wavelength channels may be processed (multiplexed or demultiplexed) by apparatus or methods disclosed herein. Since each of the switchable back-reflecting means 110 may be switched independently, the R-OADM may be employed for adding or dropping any desired number of channels in an arbitrary, reconfigurable way. If multiple channels are dropped, an additional demultiplexer of any suitable type may be employed, if needed or desired, for separating the channels dropped by the R-OADM. Similarly, if multiple channels are added, an additional multiplexer of any suitable type may be employed, if needed or desired, to combine the channels to be added by the R-OADM.

Any suitable means may be employed for switching between reflection and transmission in the channel waveguides 108. In the examples FIGS. 1 and 2, switchable back-reflecting means 110 each comprises a waveguide grating 110 formed in or on at least a portion of corresponding channel waveguide 108. Each waveguide grating 110 may be implemented in any suitable way, including those disclosed in various of the references cited hereinabove. Each waveguide grating 110 has a reflective bandwidth that substantially encompasses the corresponding wavelength band when the waveguide grating is in the reflective operational state, but that may be shifted (i.e. reconfigured) to substantially avoid the corresponding wavelength band in the transmitting operational state. The shifting of the reflective bandwidth may be accomplished in any suitable way, including but not limited to thermo-optically, electro-optically, nonlinear-optically, or by current injection into a semiconductor-based waveguide grating. The amount of reflectivity shift required to set waveguide grating 110 to the reflecting operational state versus the transmitting operational state is relatively small, since all that is required is to move the reflectivity spectrum of the grating on or off resonance with the corresponding wavelength band (so-called "binary wavelength tuning"). This may be accomplished by shifting the reflectivity spectrum of waveguide grating 110 by as little as half the channel spacing of the WDM scheme being employed, e.g. about 50 GHz in the ITU WDM scheme. Providing each wavelength channel with a dedicated waveguide grating enables reconfiguring the R-OADM with only binary wavelength tuning.

Wavelength shifts of waveguide gratings 110 on the order of 50 GHz or 100 GHz are readily achievable by incorporating thermo-optic or electro-optic polymer materials into or onto the waveguide gratings. Fractional refractive index changes on the order of a few parts in $10^4$ are typically required to achieve reflectivity spectral shifts on the order of 50 or 100 GHz, and such index changes may be achieved with temperature shifts of a few degrees (thermo-optic polymer material) or with practicable applied control voltages (electro-optic polymer material). Thermal control signal may be applied using any suitable heating or cooling elements, while control voltages may be applied by any suitably placed electrodes or contacts. It is the binary wavelength tuning characteristic of operation of the waveguide gratings that enables switching between reflecting and transmitting operational states at these readily implemented control signal levels (temperature change or applied voltage). A much smaller index shift is needed to move on or off a single wavelength channel than would be required to shift among multiple wavelength channels.

Any suitable means may be employed for shifting the reflectivity spectrum of waveguide gratings 110. Thermo-optic and electro-optic means have been described. Other suitable means may include, but are not limited to, nonlinear optical means or current injection. For example, a waveguide grating 110 incorporating one or more nonlinear optical material may be wavelength-shifted by illumination by an optical control signal. In another example, a waveguide grating 110 incorporating one or more semiconductor materials may be wavelength-shifted by current injection, via a thermo-optic effect or due to the current density. When shifting waveguide grating 110 off resonance with the corresponding signal channel, it may be preferable to shift the waveguide grating resonance to a wavelength shorter than the corresponding signal channel, to reduce undesirable optical loss.

While it is desirable to alter the spectral reflective properties of waveguide gratings 110, and one method for altering those properties is via a thermo-optic effect, it may nevertheless be desirable for other portions of the R-OADM to be "athermalized". Use of suitable combinations of materials for forming waveguides and diffractive elements may result in reduced dependence on temperature of the performance of the R-OADM. Any suitable adaptation for reducing temperature-dependent device performance may be employed within the scope of the present disclosure. Examples of such adaptations are disclosed in U.S. Pat. No. 6,985,656 cited hereinabove. It may be desirable in some instances, for example if the waveguide gratings are temperature tuned, to thermally or mechanically isolate the diffractive element sets 104 and 106 from the channel waveguides 108 and waveguide gratings 110. This may be accomplished by, for example, forming the diffractive element sets and channel waveguide gratings on separate substrates optically coupled by fibers or other means.

In another example, back-reflecting means 110 may each comprise a corresponding movable mirror within a gap formed between segments of the corresponding channel waveguide 108. The mirror is positioned between the channel waveguide segments for back-reflecting an optical signal emergent from one of the channel waveguide segments in the reflective operational state. The mirror is positioned so as to leave substantially unobstructed propagation of an optical signal between the channel waveguide segments in the transmitting operational state. Movement of the mirror between these two positions switches the back-reflecting means between reflecting and transmitting operational states, and may be achieved in any suitable way, e.g. by employing MEMS technology or other mechanical means for moving the mirror between the corresponding operational positions.

In another example, back-reflecting means 110 may each comprise a corresponding movable channel waveguide segment containing a non-tunable channel waveguide grating that is resonant with the signal propagating in the channel waveguide 108. The waveguide segment may be movable within a gap formed between segments of channel waveguide 108. In the reflecting operational state, the movable segment is positioned between the segments of channel waveguide 108 for back-reflecting an optical signal from one of the channel waveguide segments. In the transmitting operational state, the movable segment is positioned so as to leave substantially unobstructed propagation of an optical signal between the channel waveguide segments. Movement of the movable waveguide grating segment between these two positions switches the back-reflecting means between reflecting and transmitting operational states, and may be achieved in any suitable way, e.g. by employing MEMS technology or other mechanical means for moving the movable segment between the corresponding operational positions.

A method employing the exemplary R-OADM of FIG. 1 or 2 may comprise: independently setting each channel waveguide back-reflecting means 110 to either a reflecting operational state or a transmitting operational state; and receiving into slab optical waveguide 102 at optical port 112 an input optical signal comprising multiple wavelength channels within corresponding wavelength bands; and receiving from optical port 114 each corresponding wavelength channel for which corresponding back-reflecting means 110 is set in the transmitting operational state. The method may further comprise: receiving from optical port 112 each corresponding wavelength channel of the input signal for which corresponding back-reflecting means 110 is set in the reflecting operational state (i.e. wavelength channels dropped by the demultiplexer); or receiving into slab waveguide 102 at optical port 114 a second input optical signal, and receiving from optical port 114 each corresponding wavelength channel of the second input signal for which corresponding back-reflecting means 110 is set in the reflecting operational state (i.e. wavelength channels added by the multiplexer). The R-OADM may simultaneously exhibit both multiplexer and demultiplexer functionality for any desired numbers and combinations of the wavelength channels of the WDM scheme being employed.

The method may further comprise receiving the input optical signal into slab waveguide 102 at optical port 112 from circulator 120, and receiving the reflected wavelength channels (i.e. the dropped wavelength channels) from optical port 112 through circulator 120. The method may further comprise receiving the input optical signal into slab waveguide 102 at optical port 112 from circulator 120, and receiving the transmitted wavelength channels (i.e. the "thru" channels or "express" channels) from optical port 114 through circulator 122. The method may further comprise receiving a second input optical signal comprising at least one wavelength channel into slab waveguide 102 at optical port 114 from circulator 122, and receiving reflected wavelength channels (i.e. the added wavelength channels) from optical port 114 through circulator 122.

A method for forming the exemplary R-OADM of FIG. 1 or 2 comprises: forming the first group of multiple diffractive element sets 104 in or on slab waveguide 102; forming the second group of multiple diffractive element sets 106 in or on slab waveguide 102; and forming the group of multiple channel waveguides 108, including forming corresponding back-reflecting means 110 independently switchable between the transmitting operational state and the reflecting operational state.

Figure 3:
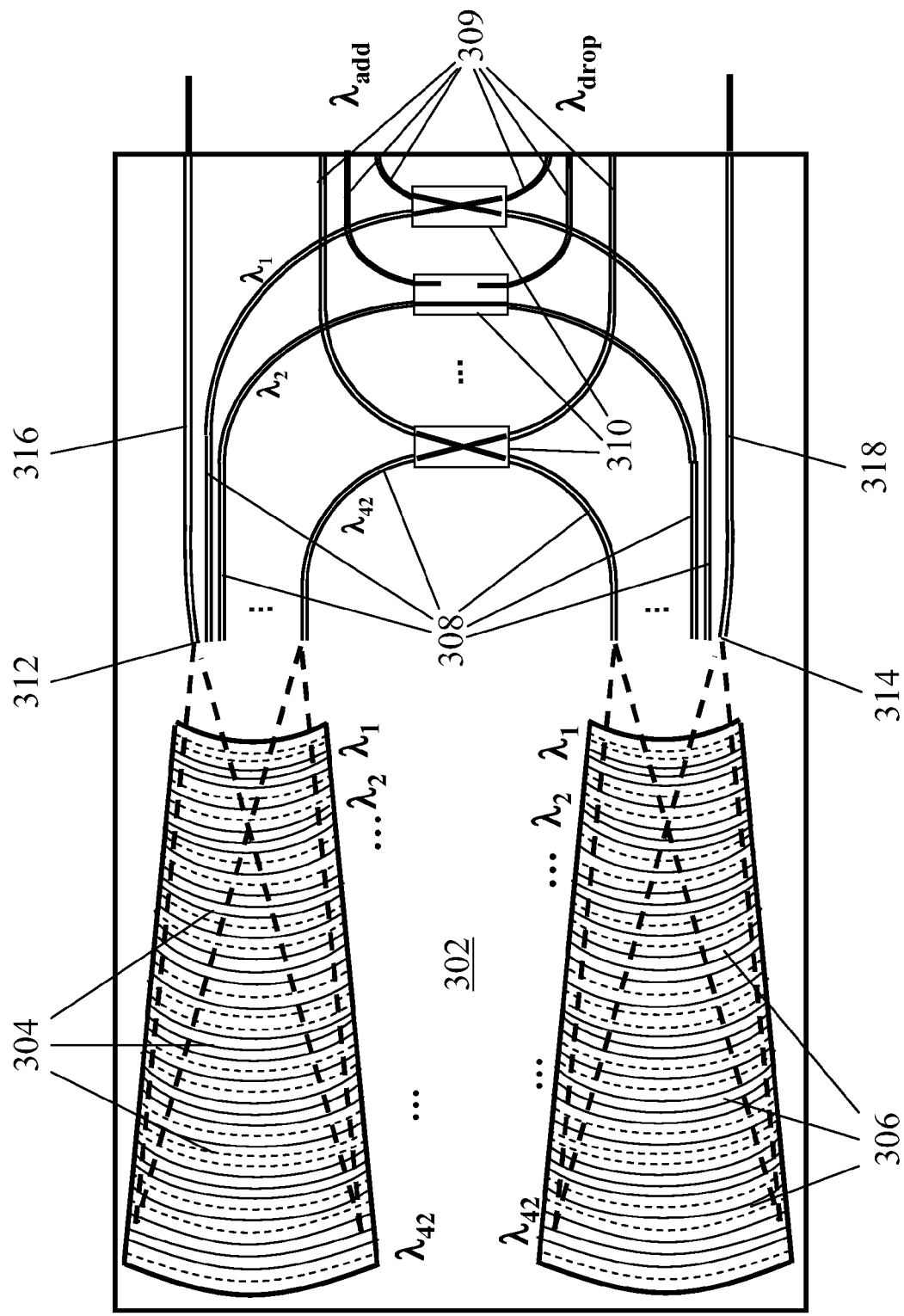
FIG. 3 illustrates schematically another exemplary embodiment of a reconfigurable optical add-drop multiplexer.

Another exemplary embodiment of an R-OADM is illustrated schematically in FIG. 3, and comprises: a slab optical waveguide 302; a first group of multiple diffractive element sets 304 formed in or on slab waveguide 302; a second group of multiple diffractive element sets 306 formed in or on slab waveguide 302; a first group of multiple channel waveguides 308 integrally formed with slab waveguide 302; a second group of multiple channel waveguides 309 integrally formed with slab waveguide 302; and a group of multiple optical switches 310. Each channel waveguide 308 of the first group is arranged for routing an optical signal between a corresponding diffractive element set 304 of the first group and a corresponding diffractive element set 306 of the second group. Each channel waveguide 309 of the second group is arranged for routing an optical signal from a corresponding one of multiple add optical ports 320 or to a corresponding one of multiple drop optical ports 322. The optical switches are each independently switchable between a non-switched operational state (optical signals remain in their respective waveguides) and a switched operational state (in which two or more optical signals are swapped among waveguides coupled by the switch). A simple example is a 2×2 optical switch coupling a pair of waveguides, wherein optical signals would remain in each waveguide in the non-switched operational state, but would be interchanged between the waveguides in the switched operational state. Optical switches 310 that are implemented in any suitable way, including 2×2 optical switches, may be employed for implementing the exemplary R-OADM of FIG. 3. In FIG. 3 slab waveguide 302, including the first group of diffractive element sets 304 and the second group of diffractive element sets 306, and the channel waveguides 308 and 309 with optical switches 310 are all integrated onto a common waveguide substrate. It may be desirable in some instances for the slab waveguide with the first group of diffractive element sets 304, the slab waveguide with the second group of diffractive element sets 306, or the channel waveguides 308 and 309 with optical switches 310 to be formed on a separate waveguide substrate, with the channel waveguides and diffractive element sets optically coupled as needed using optical fibers or other suitable means. This may be desirable for mechanically or thermally decoupling the diffractive element sets from the optical switches, for example.

Each set of diffractive elements 304 is arranged so as to route an optical signal within a corresponding wavelength band between optical port 312 and corresponding channel waveguide 308; each set of diffractive elements 306 is arranged so as to route an optical signal within the corresponding wavelength band between optical port 314 and corresponding channel waveguide 308. Each channel waveguide 308 of the first group is coupled to a corresponding channel waveguide 309 of the second group by a corresponding one of the multiple optical switches 310. Each diffractive element set 304, the corresponding channel waveguide 308, and the corresponding diffractive element set 306 are arranged so as to route an optical signal entering slab waveguide 302 through optical port 312 within the corresponding wavelength band into corresponding channel waveguide 308, transmit through corresponding channel waveguide 308 the optical signal thus routed if corresponding optical switch 310 is in the non-switched operational state (as shown for $\lambda_2$ in FIG. 3), and route the optical signal thus transmitted to optical port 314 as a "thru" or "express" signal channel. To function as a channel-dropping demultiplexer, each diffractive element set 304, corresponding channel waveguide 308, and corresponding channel waveguide 309 are arranged so as to route an optical signal entering slab waveguide 302 through optical port 312 within the corresponding wavelength band into corresponding channel waveguide 308, switch into the corresponding channel waveguide 309 the optical signal thus routed if corresponding optical switch 310 is in the switched operational state (as shown for $\lambda_1$ and $\lambda_{42}$ in FIG. 3), and transmit the optical signal thus switched to corresponding drop optical port 322 as a dropped signal channel. To function as a channel-adding multiplexer, each diffractive element set 306, corresponding channel waveguide 308, and corresponding channel waveguide 309 are arranged so as to route an optical signal within the corresponding wavelength band entering corresponding channel waveguide 309 through corresponding add optical port 320 to corresponding optical switch 310, switch into corresponding channel waveguide 308 the optical signal thus routed if corresponding optical switch 310 is in the switched operational state, and transmit the optical signal thus switched to optical port 314 as an added signal channel. The R-OADM of FIG. 3 may function as both a channel adding multiplexer and as a channel-dropping demultiplexer simultaneously, if needed or desired.

The diffractive element sets 304 and 306 of the two groups may be arranged in any suitable way, including those disclosed in various of the references cited hereinabove. Several examples have been described hereinabove. The multiple diffractive element sets 304 or 306 may be at least partly stacked, at least partly interleaved, or at least partly overlaid, as disclosed in various of the above-cited references. Optical channel waveguides 316 and 318 may be integrally formed with slab waveguide 302 for transmitting optical signals to or from optical ports 312 and 314, respectively, as described hereinabove. The corresponding wavelength bands may comprise channels of a wavelength division multiplexing scheme, as described hereinabove.

A method employing the exemplary R-OADM of FIG. 3 may comprise: independently setting each optical switch 310 to either a non-switched operational state or a switched operational state; and receiving into slab optical waveguide 302 at optical port 312 an input optical signal comprising multiple wavelength channels within corresponding wavelength bands; and receiving from optical port 314 each corresponding wavelength channel of the input optical signal for which corresponding optical switch 310 is in the non-switched operational state. The method may further comprise: receiving from corresponding drop optical port 322 each corresponding wavelength channel of the input optical signal for which corresponding optical switch 310 is in the switched operational state (i.e. wavelength channels dropped by the demultiplexer); or receiving into a corresponding add optical port 320 an added optical signal within a corresponding wavelength band, and receiving the added optical signal from optical port 314 if corresponding optical switch 310 is in the switched operational state (i.e. wavelength channels added by the multiplexer). The R-OADM may simultaneously exhibit both multiplexer and demultiplexer functionality for any desired numbers and combinations of the wavelength channels of the WDM scheme being employed.

A method for forming the exemplary R-OADM of FIG. 3 comprises: forming the first group of multiple diffractive element sets 304 in or on slab waveguide 302; forming the second group of multiple diffractive element sets 306 in or on slab waveguide 302; forming the first group of multiple channel waveguides 308; forming the second group of multiple channel waveguides 309; and forming the group of multiple optical switches 310 each coupling corresponding channel waveguides 308 and 309 and independently switchable between the non-switched operational state and the switched operational state.

In the exemplary embodiment of FIG. 2, multiple diffractive element sets 104 and 106 are shown "stacked", that is, positioned sequentially along the propagation direction of the input optical signal. As disclosed in various of the above-cited applications and patents, stacking is not the only way in which multiple diffractive element sets may be arranged in a single optical element. Multiple diffractive element sets may be arranged in an integrated optical spectrometer by stacking (as in FIG. 2), by overlaying or interleaving (as in FIGS. 1 and 3), or combinations thereof. Overlaid diffractive element sets are described hereinabove and in above-cited U.S. Pat. Nos. 6,678,429, 6,829,417, and 6,965,716 and U.S. application Ser. No. 11/280,876. Interleaved diffractive element sets are described hereinabove and in above-cited U.S. Pat. No. 6,993,223.

Various adaptations may be employed for improving the diffraction efficiency or reflection efficiency, or for reducing the optical loss of the various diffractive element sets or waveguide gratings in a R-OADM. Examples of such adaptations are disclosed in above-cited application Ser. Nos. 10/898,527 and 11/021,549.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that only a few representative individual diffractive elements are shown in the Figures. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure or appended claims. It is intended that the disclosed exemplary embodiments and methods, and equivalents thereof, may be modified while remaining within the scope of the present disclosure or appended claims.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives.

What is claimed is:

1. An optical apparatus, comprising:
a first group of multiple diffractive element sets formed in or on a slab waveguide;
a second group of multiple diffractive element sets formed in or on a slab waveguide; and
a group of multiple channel waveguides, each channel waveguide of the group being arranged for routing an optical signal between a corresponding diffractive element set of the first group and a corresponding diffractive element set of the second group, each channel waveguide of the group including corresponding means for back-reflecting an optical signal propagating along the waveguide, each back-reflecting means being switchable between a transmitting operational state and a reflecting operational state independently of operational states of the other back-reflecting means,
wherein:
each diffractive element set of the first group is arranged so as to route an optical signal within a corresponding wavelength band between a first optical port and the corresponding channel waveguide, and each diffractive element set of the second group is arranged so as to route the optical signal within the corresponding wavelength band between a second optical port and the corresponding channel waveguide; and
each diffractive element set of the first group, the corresponding channel waveguide, and the corresponding diffractive element set of the second group are arranged so as to route an optical signal entering through the first optical port within the corresponding wavelength band to the corresponding channel waveguide, transmit through the corresponding channel waveguide the optical signal thus routed if the corresponding back-reflecting means is in the transmitting operational state, and route the optical signal thus transmitted to exit through the second optical port, and wherein:

each diffractive element set of the first group and the corresponding channel waveguide are arranged so as to route an optical signal entering through the first optical port within the corresponding wavelength band to the corresponding channel waveguide, back-reflect within the corresponding channel waveguide the optical signal thus routed if the corresponding back-reflecting means is in the reflecting operational state, and route the optical signal thus back-reflected to exit through the first optical port; or each diffractive element set of the second group and the corresponding channel waveguide are arranged so as to route an optical signal entering through the second optical port within the corresponding wavelength band to the corresponding channel waveguide, back-reflect within the corresponding channel waveguide the optical signal thus routed if the corresponding back-reflecting means is in the reflecting operational state, and route the optical signal thus back-reflected to exit through the second optical port.

2. The optical apparatus of claim 1, wherein:

each diffractive element set of the first group and the corresponding channel waveguide are arranged so as to route an optical signal entering through the first optical port within the corresponding wavelength band to the corresponding channel waveguide, back-reflect within the corresponding channel waveguide the optical signal thus routed if the corresponding back-reflecting means is in the reflecting operational state, and route the optical signal thus back-reflected to exit through the first optical port; and each diffractive element set of the second group and the corresponding channel waveguide are arranged so as to route an optical signal entering through the second optical port within the corresponding wavelength band to the corresponding channel waveguide, back-reflect within the corresponding channel waveguide the optical signal thus routed if the corresponding back-reflecting means is in the reflecting operational state, and route the optical signal thus back-reflected to exit through the second optical port.

3. The optical apparatus of claim 1, wherein the slab waveguide with the first group of diffractive element sets, the slab waveguide with the second group of diffractive element sets, and the group of channel waveguides are integrated together on a common waveguide substrate.

4. The optical apparatus of claim 1, wherein:

each diffractive element of at least one set of the first or second group is individually contoured and positioned so as to preferentially route a portion of an incident optical signal between the corresponding first or second optical port and the corresponding channel waveguide as the optical signal propagates within the slab waveguide; and the diffractive elements of the at least one set are collectively arranged so as to exhibit a positional variation in amplitude, optical separation, or spatial phase over some portion of the set.

5. The optical apparatus of claim 1, wherein:

each diffractive element of at least one set of the first or second group diffracts a corresponding diffracted component of an incident optical signal with a corresponding diffractive element transfer function between the corresponding first or second optical port and the corresponding channel waveguide;

each diffractive element of the at least one set comprises at least one diffracting region having at least one altered optical property so as to enable diffraction of a portion of the incident optical signal; and the diffracting regions of each diffractive element of the at least one set are arranged so as to collectively provide a corresponding diffractive element transfer function between the corresponding first or second optical port and the corresponding channel waveguide.

6. The optical apparatus of claim 1, wherein:

the multiple diffractive element sets of the first group are at least partly stacked, at least partly interleaved, or at least partly overlaid; or the multiple diffractive element sets of the second group are at least partly stacked, at least partly interleaved, or at least partly overlaid.

7. The optical apparatus of claim 1, further comprising:

a first circulator for separating an optical signal entering the first optical port from an optical signal exiting the first optical port; or a second circulator for separating an optical signal entering the second optical port from an optical signal exiting the second optical port.

8. The optical apparatus of claim 1, wherein the corresponding wavelength bands comprise channels of a wavelength division multiplexing scheme.

9. The optical apparatus of claim 1, wherein the corresponding back-reflecting means comprises a waveguide grating formed in or on at least a portion of the corresponding channel waveguide and having a reflective bandwidth that substantially encompasses the corresponding wavelength band in the reflective operational state and that substantially avoids the corresponding wavelength band in the transmitting operational state.

10. The optical apparatus of claim 9, wherein each waveguide grating is adapted for switching between the reflecting and transmitting operational states thermo-optically, electro-optically, nonlinear-optically, or by current injection.

11. The optical apparatus of claim 1, wherein the corresponding back-reflecting means comprises a corresponding movable mirror within a gap formed between segments of the corresponding channel waveguide, the mirror being positioned between the channel waveguide segments for back-reflecting an optical signal from at least one of the channel waveguide segments in the reflective operational state, the mirror being positioned so as to leave substantially unobstructed transmission of an optical signal along the channel waveguide segments in the transmitting operational state.

12. A method, comprising:

independently setting each one of a group of multiple channel waveguide back-reflecting means to either a reflecting operational state or a transmitting operational state;

receiving into a slab optical waveguide an input optical signal entering through a first optical port, the input optical signal comprising multiple wavelength channels within corresponding wavelength bands, the slab waveguide having a first group of multiple diffractive element sets formed in or on the slab waveguide and a second group of multiple diffractive element sets formed in or on the slab waveguide, each diffractive element set of the first group being optically coupled to a corresponding diffractive element set of the second group by a corresponding channel waveguide arranged for routing an optical signal between the corresponding diffractive element sets of the first and second groups, each channel waveguide including a corresponding back-reflecting means, each diffractive element set of the first group being arranged so as to route an optical signal within a corresponding wavelength band between the first optical port and the corresponding channel waveguide, each diffractive element set of the second group being arranged so as to route the optical signal within the corresponding wavelength band between the corresponding channel waveguide and a second optical port; and receiving out of the slab waveguide an output optical signal exiting through the second optical port, the output optical signal comprising each corresponding wavelength channel of the input optical signal for which the corresponding back-reflecting means is in the transmitting operational state, each such corresponding wavelength channel entering through the input optical port, being routed by the corresponding diffractive element set of the first group from the first optical port into the corresponding channel waveguide, being transmitted by the corresponding back-reflecting means, and being routed by the corresponding diffractive element set of the second group to exit through the second optical port, and further comprising:

receiving out of the slab waveguide a dropped optical signal exiting through the first optical port, the dropped optical signal comprising each corresponding wavelength channel of the input optical signal for which the corresponding back-reflecting means is in the reflecting operational state, each such wavelength channel entering through the input optical port, being routed by the corresponding diffractive element set of the first group from the first optical port into the corresponding channel waveguide, being reflected by the corresponding back-reflecting means, and being routed by the corresponding diffractive element set of the first group to exit through the first optical port; or receiving into the slab waveguide a second input optical signal entering through the second optical port, the second input optical signal comprising at least one wavelength channel within a corresponding wavelength band, and receiving out of the slab optical waveguide an added optical signal exiting through the second optical port, the added optical signal comprising each corresponding wavelength channel of the second input signal for which the corresponding back-reflecting means is in the reflecting operational state, each such wavelength channel entering through the second optical, being routed by the corresponding diffractive element set of the second group from the second optical port into the corresponding channel waveguide, being reflected by the corresponding back-reflecting means, and being routed by the corresponding diffractive element set of the second group from the corresponding channel waveguide to exit through the second optical port.

13. The method of claim 12, comprising:
receiving out of the slab waveguide a dropped optical signal exiting through the first optical port, the dropped optical signal comprising each corresponding wavelength channel of the input optical signal for which the corresponding back-reflecting means is in the reflecting operational state, each such wavelength channel entering through the input optical port, being routed by the corresponding diffractive element set of the first group from the first optical port into the corresponding channel waveguide, being reflected by the corresponding back-reflecting means, and being routed by the corresponding diffractive element set of the first group to exit through the first optical port; and
receiving into the slab waveguide a second input optical signal entering through the second optical port, the second input optical signal comprising at least one wavelength channel within a corresponding wavelength band, and receiving out of the slab optical waveguide an added optical signal exiting through the second optical port, the added optical signal comprising each corresponding wavelength channel of the second input signal for which the corresponding back-reflecting means is in the reflecting operational state, each such wavelength channel entering through the second optical, being routed by the corresponding diffractive element set of the second group from the second optical port into the corresponding channel waveguide, being reflected by the corresponding back-reflecting means, and being routed by the corresponding diffractive element set of the second group from the corresponding channel waveguide to exit through the second optical port.

14. The method of claim 12, wherein the slab waveguide with the first group of diffractive element sets, the slab waveguide with the second group of diffractive element sets, and the group of channel waveguides are integrated together on a common waveguide substrate.

15. The method of claim 12, wherein:
each diffractive element of at least one set of the first or second group is individually contoured and positioned so as to preferentially route a portion of an incident optical signal between the corresponding first or second optical port and the corresponding channel waveguide as the optical signal propagates within the slab waveguide; and
the diffractive elements of the at least one set are collectively arranged so as to exhibit a positional variation in amplitude, optical separation, or spatial phase over some portion of the set.

16. The method of claim 12, wherein:
each diffractive element of at least one set of the first or second group diffracts a corresponding diffracted component of an incident optical signal with a corresponding diffractive element transfer function between the corresponding first or second optical port and the corresponding channel waveguide;
each diffractive element of the at least one set comprises at least one diffracting region having at least one altered optical property so as to enable diffraction of a portion of the incident optical signal; and
the diffracting regions of each diffractive element of the at least one set are arranged so as to collectively provide a corresponding diffractive element transfer function between the corresponding first or second optical port and the corresponding channel waveguide.

17. The method of claim 12, wherein:
the multiple diffractive element sets of the first group are at least partly stacked, at least partly interleaved, or at least partly overlaid; or
the multiple diffractive element sets of the second group are at least partly stacked, at least partly interleaved, or at least partly overlaid.

18. The method of claim 12, further comprising:
receiving the input optical signal entering through the first optical port from a first circulator, and receiving the dropped optical signal exiting through the first optical port through the first circulator;
receiving the input optical signal entering through the first optical port from the first circulator, and receiving the transmitted wavelength channels thereof exiting through the second optical port through a second circulator; or
receiving the second input optical signal entering through the second optical port from the second circulator, and receiving the added optical signal exiting through the second optical port through the second circulator.

19. The method of claim 12, wherein the corresponding wavelength bands comprise channels of a wavelength division multiplexing scheme.

20. The method of claim 12, wherein the corresponding back-reflecting means comprises a waveguide grating formed in or on at least a portion of the corresponding channel waveguide and having a reflective bandwidth that substantially encompasses the corresponding wavelength band in the reflective operational state and that substantially avoids the corresponding wavelength band in the transmitting operational state.

21. The method of claim 20, wherein the waveguide grating is adapted for switching between the reflecting and transmitting operational states thermo-optically, electro-optically, nonlinear-optically, or by current injection.

22. The method of claim 12, wherein the corresponding back-reflecting means comprises a corresponding movable mirror within a gap formed between segments of the corresponding channel waveguide, the mirror being positioned between the channel waveguide segments for back-reflecting an optical signal from one of the channel waveguide segments in the reflective operational state, the mirror being positioned so as to leave substantially unobstructed transmission of an optical signal along the channel waveguide segments in the transmitting operational state.

23. An optical apparatus, comprising:
a first group of multiple diffractive element sets formed in or on a slab waveguide;
a second group of multiple diffractive element sets formed in or on a slab waveguide;
a first group of multiple channel waveguides, each channel waveguide of the first group being arranged for routing an optical signal between a corresponding diffractive element set of the first group and a corresponding diffractive element set of the second group;
a second group of multiple channel waveguides, each channel waveguide of the second group being arranged for routing an optical signal from a corresponding one of multiple add optical ports or to a corresponding one of multiple drop optical ports; and a group of multiple optical switches each independently switchable between a non-switched operational state and a switched operational state, wherein:

each set of diffractive elements of the first group is arranged so as to route an optical signal within a corresponding wavelength band between a first optical port and the corresponding channel waveguide of the first group, and each set of diffractive elements of the second group is arranged so as to route an optical signal within the corresponding wavelength band between a second optical port and the corresponding channel waveguide of the first group;

each channel waveguide of the first group is coupled to a corresponding channel waveguide of the second group by a corresponding one of the multiple optical switches; and each diffractive element set of the first group, the corresponding channel waveguide of the first group, and the corresponding diffractive element set of the second group are arranged so as to route an optical signal entering through the first optical port within the corresponding wavelength band to the corresponding channel waveguide of the first group, transmit through the corresponding channel waveguide of the first group the optical signal thus routed if the corresponding optical switch is in the non-switched operational state, and route the optical signal thus transmitted to exit through the second optical port, and wherein:

each diffractive element set of the first group, the corresponding channel waveguide of the first group, and the corresponding channel waveguide of the second group are arranged so as to route an optical signal entering through the first optical port within the corresponding wavelength band to the corresponding channel waveguide of the first group, switch into the corresponding channel waveguide of the second group the optical signal thus routed if the corresponding optical switch is in the switched operational state, and transmit the optical signal thus switched to exit through the corresponding drop optical port; or each diffractive element set of the second group, the corresponding channel waveguide of the first group, and the corresponding channel waveguide of the second group are arranged so as to route an optical signal within the corresponding wavelength band entering the corresponding channel waveguide of the second group through the corresponding add optical port to the corresponding optical switch, switch into the corresponding channel waveguide of the first group the optical signal thus routed if the corresponding optical switch is in the switched operational state, and transmit the optical signal thus switched to exit through the second optical port.

24. The optical apparatus of claim 23, wherein:

each channel waveguide of the second group routes an optical signal between the corresponding add optical port and the corresponding drop optical port;

each diffractive element set of the first group, the corresponding channel waveguide of the first group, and the corresponding channel waveguide of the second group are arranged so as to route an optical signal entering through the first optical port within the corresponding wavelength band to the corresponding channel waveguide of the first group, switch into the corresponding channel waveguide of the second group the optical signal thus routed if the corresponding optical switch is in the switched operational state, and transmit the optical signal thus switched to exit through the corresponding drop optical port; and each diffractive element set of the second group, the corresponding channel waveguide of the first group, and the corresponding channel waveguide of the second group are arranged so as to route an optical signal within the corresponding wavelength band entering the corresponding channel waveguide of the second group through the corresponding add optical port to the corresponding optical switch, switch into the corresponding channel waveguide of the first group the optical signal thus routed if the corresponding optical switch is in the switched operational state, and transmit the optical signal thus switched to exit through the second optical port.

25. The optical apparatus of claim 23, wherein the slab waveguide with the first group of diffractive element sets, the slab waveguide with the second group of diffractive element sets, the first group of channel waveguides, and the second group of channel waveguides are integrated together on a common waveguide substrate.

26. The optical apparatus of claim 23, wherein:

each diffractive element of at least one set of the first or second group is individually contoured and positioned so as to preferentially route a portion of an incident optical signal between the corresponding first or second optical port and the corresponding channel waveguide as the optical signal propagates within the slab waveguide; and the diffractive elements of the at least one set are collectively arranged so as to exhibit a positional variation in amplitude, optical separation, or spatial phase over some portion of the set.

27. The optical apparatus of claim 23, wherein:

each diffractive element of at least one set of the first or second group diffracts a corresponding diffracted component of an incident optical signal with a corresponding diffractive element transfer function between the corresponding first or second optical port and the corresponding channel waveguide;

each diffractive element of the at least one set comprises at least one diffracting region having at least one altered optical property so as to enable diffraction of a portion of the incident optical signal; and the diffracting regions of each diffractive element of the at least one set are arranged so as to collectively provide a corresponding diffractive element transfer function between the corresponding first or second optical port and the corresponding channel waveguide.

28. The optical apparatus of claim 23, wherein:

the multiple diffractive element sets of the first group are at least partly stacked, at least partly interleaved, or at least partly overlaid; or the multiple diffractive element sets of the second group are at least partly stacked, at least partly interleaved, or at least partly overlaid.

29. The optical apparatus of claim 23, wherein the corresponding wavelength bands comprise channels of a wavelength division multiplexing scheme.

30. A method, comprising:

independently setting each one of a group of multiple optical switches to either a non-switched operational state or a switched operational state;

receiving into a slab optical waveguide an input optical signal entering through a first optical port, the input optical signal comprising multiple wavelength channels within corresponding wavelength bands, the slab waveguide having a first group of multiple diffractive element sets formed in or on the slab waveguide and a second group of multiple diffractive element sets formed in or on the slab waveguide, each diffractive element of the first group being optical coupled to a corresponding diffractive element set of the second group by a corresponding one of a first group of channel waveguides arranged for routing an optical signal between the corresponding diffractive element sets of the first and second groups, each channel waveguide of the first group being coupled to a corresponding one of a second group of channel waveguides by a corresponding optical switch, each channel waveguide of the second group being arranged for routing an optical signal from a corresponding one of multiple add optical ports or to a corresponding one of multiple drop optical ports, each diffractive element set of the first group being arranged so as to route an optical signal within a corresponding wavelength band between the first optical port and the corresponding channel waveguide of the first group, each diffractive element set of the second group being arranged so as to route the optical signal within the corresponding wavelength band between the corresponding channel waveguide of the first group and a second optical port; and receiving out of the slab waveguide an output optical signal exiting through the second optical port, the output optical signal comprising each corresponding wavelength channel of the input optical signal for which the corresponding optical switch is in the non-switched operational state, each such corresponding wavelength channel entering through the input optical port, being routed by the corresponding diffractive element set of the first group from the first optical port to the corresponding channel waveguide of the first group, being transmitted through the corresponding channel waveguide of the first group, and being routed by the corresponding diffractive element set of the second group to exit through the second optical port, and further comprising:

receiving out of the slab waveguide at least one dropped optical signal exiting through a corresponding drop optical port, each dropped optical signal comprising the corresponding wavelength channel for which the corresponding optical switch is in the switched operational state, each such wavelength channel entering through the first optical port, being routed by the corresponding diffractive element set of the first group from the first optical port to the corresponding channel waveguide of the first group, being switched into the corresponding channel waveguide of the second group, and being transmitted to exit through the corresponding drop optical port; or receiving through the corresponding add optical port into the corresponding channel waveguide of the second group an added optical signal within the corresponding wavelength band, and receiving out of the slab waveguide the added optical signal exiting through the second optical port if the corresponding optical switch is in the switched operational state, the added optical signal entering through the corresponding add optical port, being routed by the corresponding channel waveguide of the second group from the corresponding add optical port to the optical switch, being switched by the corresponding optical switch into the corresponding channel waveguide of the first group, and being routed by the corresponding diffractive element set of the second group to exit through the second optical port.

31. The method of claim 30, comprising:

receiving out of the slab waveguide at least one dropped optical signal exiting through a corresponding drop optical port, each dropped optical signal comprising the corresponding wavelength channel for which the corresponding optical switch is in the switched operational state, each such wavelength channel entering through the first optical port, being routed by the corresponding diffractive element set of the first group from the first optical port to the corresponding channel waveguide of the first group, being switched into the corresponding channel waveguide of the second group, and being transmitted to exit through the corresponding drop optical port; and receiving through the corresponding add optical port into the corresponding channel waveguide of the second group an added optical signal within the corresponding wavelength band, and receiving out of the slab waveguide the added optical signal exiting through the second optical port if the corresponding optical switch is in the switched operational state, the added optical signal entering through the corresponding add optical port, being routed by the corresponding channel waveguide of the second group from the corresponding add optical port to the optical switch, being switched by the corresponding optical switch into the corresponding channel waveguide of the first group, and being routed by the corresponding diffractive element set of the second group to exit through the second optical port.

32. The method of claim 30, wherein the slab waveguide with the first group of diffractive element sets, the slab waveguide with the second group of diffractive element sets, the first group of channel waveguides, and the second group of channel waveguides are integrated together on a common waveguide substrate.

33. The method of claim 30, wherein:

each diffractive element of at least one set of the first or second group is individually contoured and positioned so as to preferentially route a portion of an incident optical signal between the corresponding first or second optical port and the corresponding channel waveguide as the optical signal propagates within the slab waveguide; and the diffractive elements of the at least one set are collectively arranged so as to exhibit a positional variation in amplitude, optical separation, or spatial phase over some portion of the set.

34. The method of claim 30, wherein:

each diffractive element of at least one set of the first or second group diffracts a corresponding diffracted component of an incident optical signal with a corresponding diffractive element transfer function between the corresponding first or second optical port and the corresponding channel waveguide;

each diffractive element of the at least one set comprises at least one diffracting region having at least one altered optical property so as to enable diffraction of a portion of the incident optical signal; and the diffracting regions of each diffractive element of the at least one set are arranged so as to collectively provide a corresponding diffractive element transfer function between the corresponding first or second optical port and the corresponding channel waveguide.

35. The method of claim 30, wherein:

the multiple diffractive element sets of the first group are at least partly stacked, at least partly interleaved, or at least partly overlaid; or the multiple diffractive element sets of the second group are at least partly stacked, at least partly interleaved, or at least partly overlaid.

36. The method of claim 30, wherein the corresponding wavelength bands comprise channels of a wavelength division multiplexing scheme.

* * * * *